United States Patent [19]
Buckley et al.

[11] Patent Number: 5,240,643
[45] Date of Patent: Aug. 31, 1993

[54] STRAIN SENSING COMPOSITES

[75] Inventors: Leonard J. Buckley, Doylestown; Gary C. Neumeister, Blue Bell, both of Pa.

[73] Assignee: The United States of America as represented by the Secretary of the Navy, Washington, D.C.

[21] Appl. No.: 852,618

[22] Filed: Mar. 11, 1992

[51] Int. Cl.$^5$ .............................. G01L 1/24
[52] U.S. Cl. .................. 252/408.1; 385/12; 385/13; 385/141
[58] Field of Search .............. 385/13, 12, 141; 252/408.1

[56] References Cited

U.S. PATENT DOCUMENTS

| | | | |
|---|---|---|---|
| 4,515,429 | 5/1985 | Smith et al. | 385/4 |
| 4,788,151 | 11/1988 | Preziosi et al. | 252/408.1 |
| 4,789,637 | 12/1988 | Preziosi et al. | 252/408.1 |
| 4,849,500 | 7/1989 | Rubner | 385/12 |
| 4,875,759 | 10/1989 | Ogawa | 385/141 X |
| 4,916,211 | 4/1990 | Rubner | 528/480 |
| 5,018,829 | 5/1991 | Ogawa | 385/141 |
| 5,085,801 | 2/1992 | Thierry et al. | 252/408.1 |
| 5,094,527 | 5/1992 | Martin | 356/32 |

Primary Examiner—Robert L. Stoll
Assistant Examiner—Valerie Fee
Attorney, Agent, or Firm—James V. Tura; James B. Bechtel; Susan E. Verona

[57] ABSTRACT

This invention comprises the use of diacetylene-containing polymers, e.g., polyamides containing reactive diacetylene groups that change their absorption in the visible spectrum with the application of strain as a strain sensing device in various organic matrix composites such as an epoxy laminated composite. The built in sensors in accordance with this invention will not affect the mechanical performance of the composite and will indicate strain without the need for extensive electronic equipment to measure the light pulse amplitude or phase before and after strain.

9 Claims, 3 Drawing Sheets

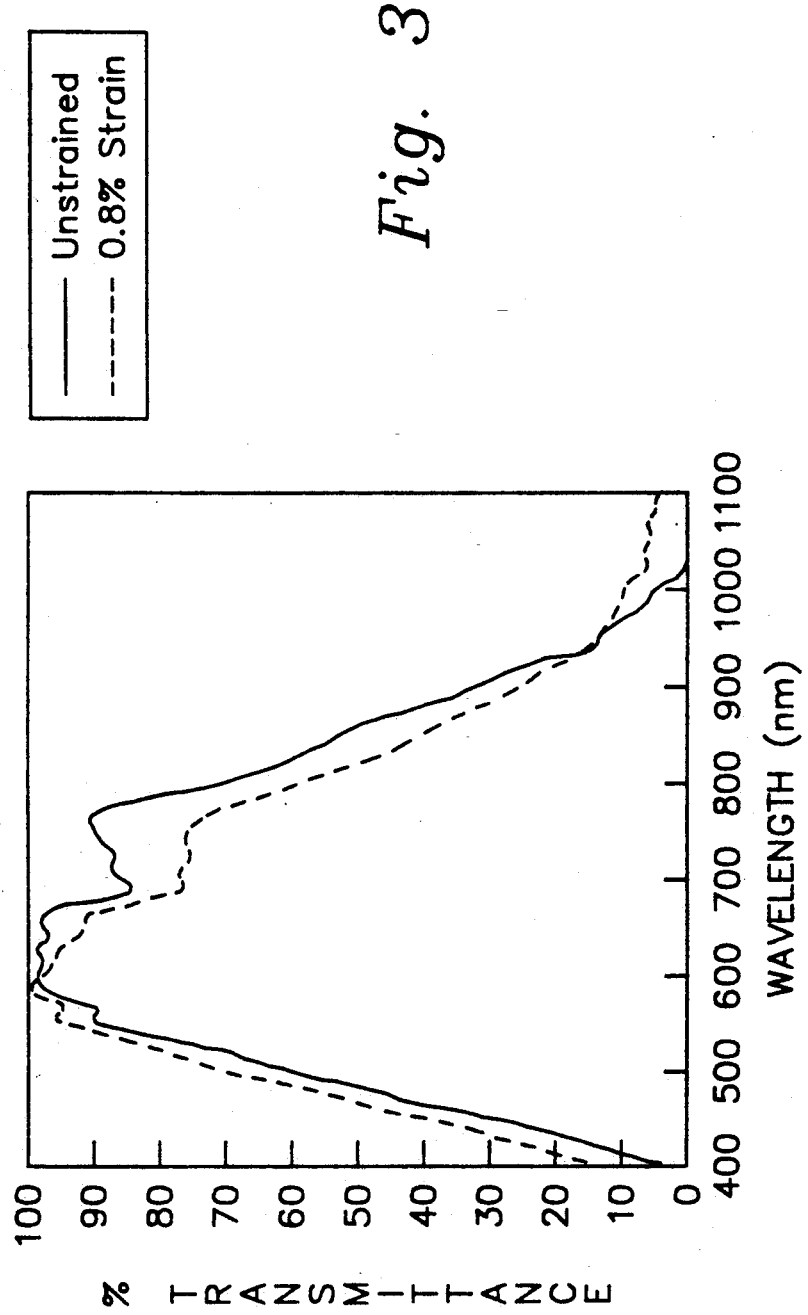

STRAIN SENSING COMPOSITES

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to a strain sensing device and more specifically to optically-active polymer clad fiber optics embedded in an organic matrix or organic matrix composite such as an epoxy composite. The strain sensing polymer-containing device consist essentially of diacetylene-containing polymers such as the diacetylene polyamides in combination with fiber optics capable of changing absorption in the visible spectrum while under strain. It is beneficial to have means for nondestructively evaluating strain resulting from the deformation of composites, e.g., fiber/epoxy laminates, in various structures and particularly in aerospace structures. Early warnings of excessive strain that might cause failure in flexible structures have many advantages.

There is now a growing interest in the area of sensor technology regarding the use of optical fibers as sensors to detect strain, pressure, temperature, etc.; see the Journal of Quantum Electronics, Volume QE-18, 1986. One means of measuring strain in composites using embedded optical fibers is disclosed by Claus et al., SPIE International Symposium, Volume 566, 1985. Here the work demonstrated the feasibility of an optical fiber interferometric strain measurement wherein the optical fibers were embedded in a composite laminate before the laminate was fabricated. The strain measurements were conducted to demonstrate that the system was functional and that there was reasonable correlation between the strain measured by the system and theoretical predictions. Further, the increased demand for strong flexible and light weight materials for the fabrication of various aircraft parts has driven the development of polymer based composites. These composites are useful as components of large structures, particularly aerospace structures. Thus, a nondestructive evaluation method is needed to determine the component's integrity not only during the manufacturing process but ultimately in the end use of the components. Moreover, because of the tremendous size of aerospace components, the nondestructive evaluation technique must be capable of characterizing a large surface area of the component.

In this regard, the prior art has considered embedding optical and acoustical wave guides as sensors for such large scale components. The acoustic wave guides have cross-sectional dimensions which are larger but still comparable with graphite fibers in an epoxy composite. Here the fibers may be embedded in the composite during the manufacturing process without changing the structure of the composite. These sensors provide there own mechanism for signal transfer and due to the potential dielectric nature of acoustic and optical wave link, the dielectric composition of the composite can be maintained. However, it should be noted that the diacetylene coated fiber sensors in accordance with this invention exhibit additional advantages over the acoustic sensors, particularly for large scale testing in that, for example, optical fiber attenuation for unit length is far less than that of acoustic rods.

In a graphite epoxy composite, e.g., the fiber bundle orientation from layer to layer alternates in order to give the material strength in several inplane directions. The spaces between the fibers in the bundles and between the bundles and between the layers in the composite are completly filled with the epoxy resin. The strain transfer from the material to the fiber depends also upon the mechanical properties of the fiber jacket. Although there has been much work done to identify jacketing materials having elastic constants to enhance the fiber pressure sensitivity, there has been little work done to determine the trade off between such enhancement and the effect of the jacket on the mechanical properties of the composite. The prior art also has embedded both bare optical fibers in a single pass straight length and polymer coated fibers in back and forth serpentine patterns between adjacent parallel, perpendicular and oriented composites; see the Journal of Nondestructive Evaluation 41,106 (1983) by R. O. Claus et al. Here the experiments used optical time domain reflectometry (OTDR) which required extensive electronic equipment to launch an optical pulse and to detect the pulse in the fiber. The amplitude of a pulse before and after the deformation are compared and then related to the strain. Other studies relied on the phase change as in relationship to the strain through a Mach-Zehnder Interferometric Measurement; see Journal of Composite Technology and Research 10,1 (1988).

SUMMARY OF THE INVENTION

In accordance with this invention, polymers derived from diacetylene, i.e., diacetylene-containing polymers such as the diacetylene-amides, that change their absorption in the visible spectrum upon the application of strain are used in combination with optical fibers as a strain-sensing device in an organic matrix composite such as graphite/epoxy composites. The embedded polymeric sensor will not affect the mechanical performance of the composite and will show strain without the need for extensive electronic equipment for the measurement of light pulse amplitude or phase before and after strain. The incorporation of the diacetylene-containing polymers as a cladding or coating on optical fibers is essential to the operation of an in-situ sensor. The equipment needed for the measurement consist essentially of a visible light source and a spectroradiometer. This can be coupled to any fiber of fiber optic network located in a specific critical area of the composite. The advantage of this invention consist essentially of using the change in the absorption or transmission behavior with strain as the signal in comparison to a change in phase or amplitude which is more difficult to monitor. This approach does not require the use of a laser or extensive electronic equipment for the detection and interpretation of the signal.

Accordingly, it is an object of this invention to provide a strain-sensing composite comprising diacetylene-containing polymers capable of changing absorption in the visible spectrum while under strain. It is a further object of this invention to provide diacetylene-containing polymers coated or cladded onto optical fibers imbedded in an organic matrix composite.

These and other objects will become apparent from a further and more detailed description of the invention as follows:

BRIEF DESCRIPTION OF THE DRAWINGS

FIG. 3 shows the percent of transmittance versus the wavelength of a diacetylene-containing polymer as a cladding on the fiber optic embedded in a composite before and after 0.8% strain.

DETAILED DESCRIPTION OF THE PREFERRED EMDODIMENT

Figure 1:
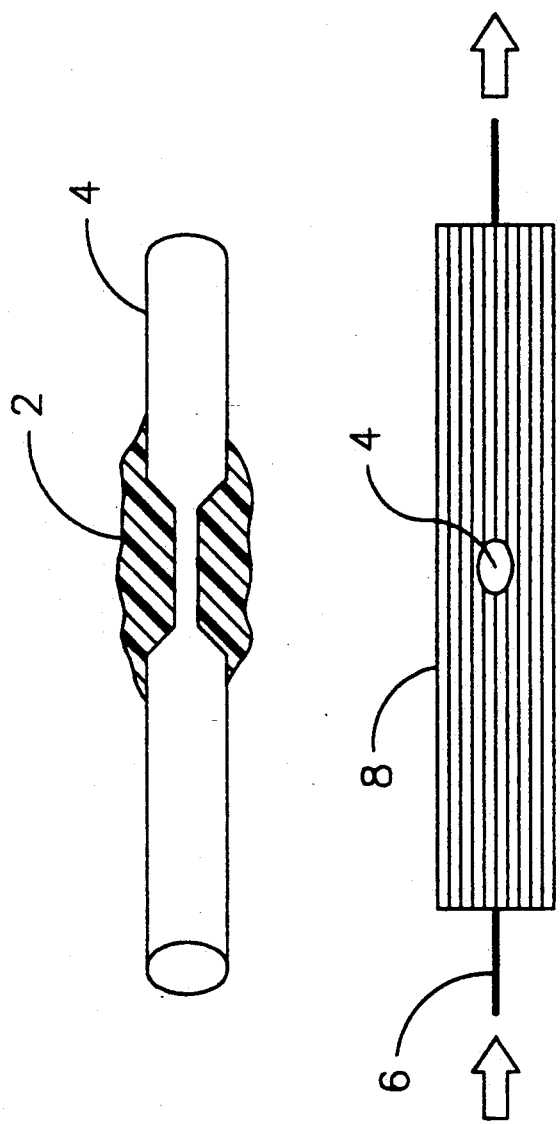
FIG. 1 shows fibers of a diacetylene-containing polymer as a cladding on optical fibers in a laminate as an in-situ sensor.
Figure 2:
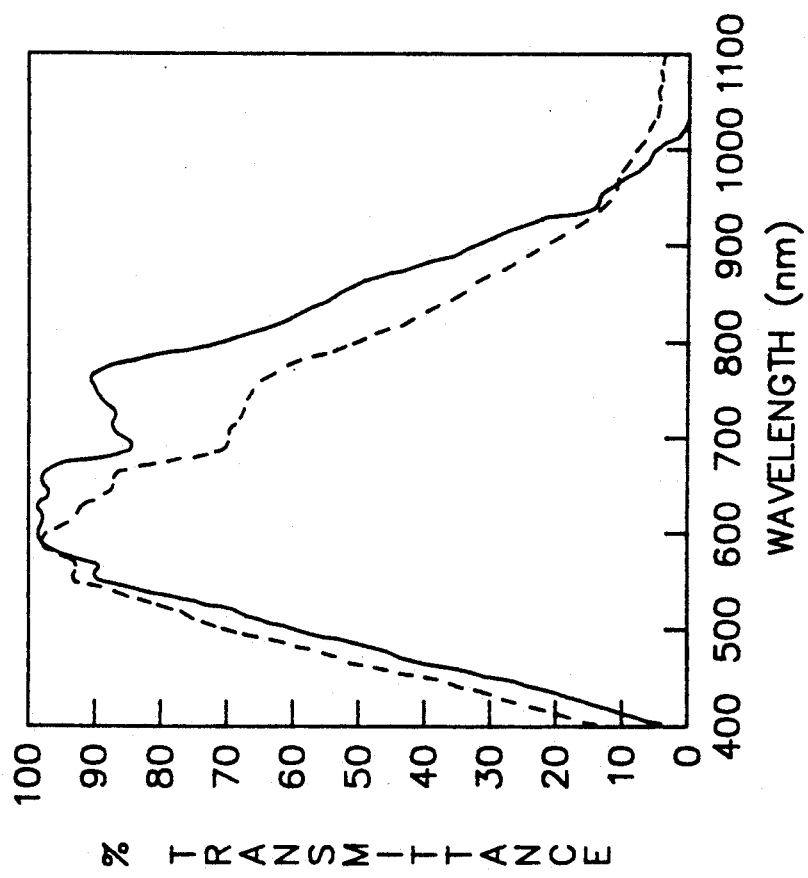
FIG. 2 shows the percent of transmittance versus the wavelength of a diacetylene-containing polymer as a cladding on the fiber optic embedded in a composite before and after 1.0% strain.

More specifically, this invention comprises the use of diacetylene-containing polymers, e.g. polyamides containing reactive diacetylene groups that change their absorption in the visible spectrum with the application of strain as a strain sensing article in various organic matrix composites such as an epoxy laminated composite. The built in sensors in accordance with this invention will not affect the mechanical performance of the composite and will indicate strain without the need for extensive electronic equipment to measure the light pulse amplitude or phase before and after strain. The diacetylene-containing polymers are incorporated in the organic matrix as a cladding on optical fibers in a laminated composite in an amount sufficient to operate as an in-situ sensor.

The term fiber includes a single optical fiber with the diacetylene-containing polymer in place as the cladding. The various organic matrices that may be used for embedding optical fibers containing the diacetylene-containing polymers include well known matrices of organic composites or laminates, such as the epoxies, polyamides, polyimides, polyamide-imides, polyurethanes, bismaleimides, polyphenylene sulfides, polyetheretherketones, and various combinations of polymers. These polymers are known to be useful in the preparation of composites and/or laminates in the fabrication of structural parts, and particularly the fabrication of structural parts in aircraft and alike.

For purposes of this invention, diacetylene-containing polymers include various segmented copolymers containing a reactive diacetylene unit in one of the segments. One type of diacetylene segmented copolymers are prepared by using urethane chemistry as taught by Miller et al.; see Macromolecules, 18, 1985, the disclosures of which is hereby incorporated by reference. Here, the first step of a two-step solution polymerization technique uses urethane chemistry, e.g., a hydroxyl or carboxyl terminated prepolymer is end-capped with isocyanate groups. The second step is a step-wise reaction of the isocyanate groups with a diol or a diacid which in this case must contain a diacetylene functionality within the molecule. This chain extension step increases the molecular weight of the polymer as the urethane or amide linages join the molecules together. The preferred diisocyanates include 4,4'-methylene bis (phenylisocyanate) (MDI) and hexamethylene diisocyanate (HDI). The preferred diacetylene diols include 2,4-hexadiyne 1,6 diol; 5,7-dodecadiyne 1,12 diol and 10,12-docosadiyne-1,22-diol, etc.

These polyurethane-diacetylene elastomers are soluble in organic solvents, such as toluene and tetrahydrofuran, etc. Upon exposure to UV radiation or thermal energy, the elastomers are converted into polydiacetylene network polymers as evidenced by the dramatic color change which occurs as the conjugated backbone of the polydiacetylene is formed. These polyurethane-diacetylene elastomers are not the only segmented copolymers that would be expected to exhibit these novel properties. This becomes evident after examining the structure and properties of different prepolymers and diacetylene monomers which can be utilzied in the synthesis of the segmented copolymers.

Particularly preferred diacetylene-containing polymers include the polyamide-containing diacetylene groups as part of the repeating polymeric structure. It is known that the reactive diacetylene group can be readily incorporated into many different polymeric structures making it possible to synthesize a variety of fiber and film-forming polymers with tunable mechanical and optical properties. This chemistry provides a means of introducing well defined nonrandom cross links into a polymer without disruption of the packing and order of the polymeric chain. Moreover, since the resulting cross links are actually conjugated polydiacetylene chains, the material developed all of the novel optical properties characteristic of the polydiacetylenes such as nonlinear optical behavior, etc. In the case of polyamides, it is possible to systematically vary the nature of the polymer chain from flexible to semiflexible to rigid by controlling the length of the spacer groups separating the diacetylene functionality from the amide linkage and the type of diamide, i.e., aromatic or aliphatic, used to synthesize the polymer.

The diacetylene-containing polyamides are prepared by condensation wherein a diacid chloride is reacted with hexanediamine to form an aliphatic polyamide-diacetylene (PADA6,22) and with 1,4 phenylenediamine to form a partially aromatic polyamide-diacetylene. The reactive diacetylene groups contained along the backbone of the polyamides may be activated by UV radiation or by ionizing radiation to give a network structure in which the newly fromed crosslinks are actually conjugated polydiacetylene chains. Knowledge of the extent of diacetylene conversion to polydiacetylene chains is important to understand how this chemistry influences the final properties of these materials.

In the polyamide-diacetylene polymers, the side-groups are actually segments of a polymer chain containing two amide hydrogen bonds per segment. This results in a sidegroup organization that is much less flexible or "entropically active" than the urethane substituted polydiacetylenes synthesized from diacetylene monomers. The amide hydrogen bonds serve as anchors that hold the sidegroups in place thereby preventing complete disordering at elevated temperatures and insuring reversible behavior. Once a significant portion of the hydrogen bonds have been broken as would occur with extensive disordering, the reversibility of the thermochromic transition becomes highly compromised. In this light, the higher temperature capabilities of the aromatic-based polyamide can be seen as a direct consequency of the decreased sidegroup mobility brought about by the incorporation of a rigid phenyl ring in the sidegroup. A detailed discussion regarding the polyamide-containing diacetylene polymers is available by Rubner et al., Macromolecules, 22, 2130, 1989.

It is obvious that there are other variations and modifications which can be made without departing from the spirit and scope of the invention as particularly set forth in the appendant claims.

The invention claimed:

1. A strain-sensing device comprising an effective amount of a strain-sensing polymer coated or cladded on a fiber optic embedded in an organic matrix composite to detect strain; said strain-sensing polymer consisting essentially of a diacetylene-containing polymer capable of changing absorption in the visible spectrum while under strain.

2. The strain-sensing composite of claim 1 wherein the diacetylene-containing polymer is a copolymer of diacetylene.

3. The strain-sensing composite of claim 1 wherein the diacetylene-containing polymer is a diacetylene-containing polyamide.

4. The strain-sensing composite of claim 1 wherein the strain-sensing polymer is a polyamide-diacetylene polymer cladded on optical fibers embedded in an epoxy matrix.

5. A method of detecting strain in an organic matrix composite which comprises incorporating in said composite a strain detecting amount of a strain-sensing polymer; said strain-sensing polymer consisting essentially of diacetylene-containing polymers capable of changing absorption in the visible spectrum while under strain.

6. The method of claim 5 wherein the diacetylene-containing polymer is cladded on optical fibers.

7. The method of claim 5 wherein the diacetylene-containing polymer is a copolymer of diacetylene.

8. The method of claim 5 wherein the diacetylene-containing polymer is a polyamide-diacetylene.

9. The method of claim 5 wherein the strain on the organic matrix composite is detected with a strain gauge.

* * * * *